United States Patent
Kurachi et al.

(10) Patent No.: US 6,333,286 B1
(45) Date of Patent: Dec. 25, 2001

(54) GLASS COMPOSITION AND SUBSTRATE FOR INFORMATION RECORDING MEDIA COMPRISING THE SAME

(75) Inventors: Junji Kurachi; Akihiro Koyama; Shoichi Kishimoto; Nobuyuki Yamamoto, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/377,149

(22) Filed: Aug. 19, 1999

(30) Foreign Application Priority Data

Sep. 11, 1998 (JP) .................................... 10-258933

(51) Int. Cl.⁷ ........................... C03C 3/085; C03C 3/087; B32B 17/00
(52) U.S. Cl. ................ 501/69; 501/56; 501/57; 501/64; 501/70; 501/72; 428/64.2; 428/65.3; 428/65.6
(58) Field of Search ................. 501/69, 70, 72, 501/64, 55, 56, 57; 428/426, 64.2, 65.3, 65.6

(56) References Cited

U.S. PATENT DOCUMENTS

| | | | |
|---|---|---|---|
| 3,885,182 | * | 5/1975 | Chu ........................................ 501/70 |
| 4,002,449 | * | 1/1977 | Spanoudis .............................. 501/69 |
| 4,189,325 | * | 2/1980 | Barrett et al. ........................... 501/69 |
| 4,288,250 | * | 9/1981 | Yamashita .............................. 501/79 |
| 4,521,524 | * | 6/1985 | Yamashita .............................. 501/79 |
| 4,562,161 | * | 12/1985 | Mennemann et al. .................. 501/58 |
| 5,057,018 | * | 10/1991 | Bowen ................................... 501/69 |
| 5,078,771 | * | 1/1992 | Wu ......................................... 501/56 |
| 5,308,803 | * | 5/1994 | Cliffiord et al. ........................ 501/69 |
| 5,324,691 | * | 6/1994 | Tarumi et al. .......................... 501/72 |
| 5,599,754 | * | 2/1997 | Maeda et al. .......................... 501/70 |
| 5,631,195 | * | 5/1997 | Yanagisawa et al. .................. 501/70 |
| 5,888,917 | * | 3/1999 | Kawaguchi et al. ................... 501/70 |

FOREIGN PATENT DOCUMENTS 3-40933 * 2/1991 (JP) .

* cited by examiner

Primary Examiner—Michael Marcheschi
(74) Attorney, Agent, or Firm—Sughrue Mion, PLLC

(57) ABSTRACT

A glass composition is disclosed which has a high modulus of elasticity (Young's modulus) and a high rigidity (modulus of elasticity/specific gravity) and is capable of being effectively inhibited from bending or vibrating. Also disclosed is a substrate for information recording media which comprises the glass composition. The glass composition comprises the following components, in terms of mol %: 55 to 65% $SiO_2$, 0.5 to less than 6% $Al_2O_3$, 12 to 22% $Li_2O$, 0 to 5% $Na_2O$, 0 to 10% $TiO_2$, 0 to 3% $ZrO_2$, 0 to 8% MgO, 0 to 18% CaO, and 0 to 6% SrO, provided that the content of RO (RO=MgO+CaO+SrO) is 5 to 18%.

8 Claims, No Drawings

GLASS COMPOSITION AND SUBSTRATE FOR INFORMATION RECORDING MEDIA COMPRISING THE SAME

FIELD OF THE INVENTION

The present invention relates to a high-modulus glass composition. More particularly, this invention relates to a glass composition suitable for use as a substrate for information recording media, which is required to have excellent surface smoothness and high modulus of elasticity. The present invention further relates to a substrate for information recording media, which comprises the glass composition, and to an information recording medium.

BACKGROUND OF THE INVENTION

Information recording devices such as magnetic disks are always required to have a larger recording capacity and to attain a reduction in access time such as disk rotational delay. One possible means for satisfying the latter requirement is to heighten the rotational speed of a medium.

However, since the media are weighed down by themselves, they resonate considerably at an increased rotational speed. Eventually, the surface of such a medium comes into contact with the head to cause an error or crushing. It is therefore impossible to narrow the gap between the magnetic disk head and the recording medium to or below a certain level, and this constitutes a serious obstacle to an increase in recording capacity.

For diminishing the resonance of the medium being rotated, it is necessary to heighten both a modulus of elasticity (Young's modulus) of the substrate of the medium and a rigidity thereof which is the value obtained by dividing the Young's modulus by the density.

Aluminum alloy which has been most commonly used as the substrates of magnetic disks has a modulus of elasticity in the above meaning of 71 GPa and a rigidity as defined above of 26 GPa·cm$^3$/g. This conventional substrate material having such properties hardly copes with the trend toward higher rotational speeds of 10,000 rpm and above. In addition, it has become necessary to increase the thickness of substrates made of the above material from the standpoints of modulus of elasticity (Young's modulus) and rigidity (Young's modulus/density), despite of the current trend toward thickness reduction in disk substrates for device miniaturization.

In contrast, substrates made of a tempered glass are superior to the aluminum substrate in both modulus of elasticity and density. For example, a glass substrate obtained by subjecting a commercially available soda-lime glass to ion exchange in a molten potassium salt is on the market. This substrate has a modulus of elasticity of 72 GPa and a rigidity of 29 GPa·cm$^3$/g.

Also known besides the above one is a glass substrate obtained by tempering commercially available Corning 0317. Although this substrate has a modulus of elasticity of 72 GPa and a rigidity of 29 GPa·cm$^3$/g, these properties are still insufficient.

A high-rigidity substrate for information recording media which is made of a material other than tempered glasses is on the market. This substrate comprises a crystallized glass having a modulus of elasticity of 90 GPa and a rigidity of 38 GPa·cm$^3$/g. However, this substrate, after polishing, inevitably has residual crystal grains projecting from the surface because of the nature of the production process in which crystals are precipitated inside. Namely, this crystallized glass substrate has a drawback that it is inferior in surface smoothness to the substrates made of a tempered glass.

Furthermore, JP-A-10-81542 (the term "JP-A" as used herein means an "unexamined published Japanese patent application") discloses a material for use as a substrate for information recording media. This material comprises a glass which is based on $SiO_2$-$Al_2O_3$-RO (wherein R is a bivalent metal) and contains at least 20 mol % $Al_2O_3$ or at least 20 mol % MgO. However, as apparent from the Examples shown in the above patent document, this prior art material has problems that it has a high liquidus temperature and hence poor moldability, and that it is unsuitable for high-speed rotation because of its high density.

Consequently, in view of the expected future trend toward even higher rotational speeds in information recording devices and smaller thicknesses in disk substrates, there is a desire for a glass composition which has further improved properties, i.e., which has a high modulus of elasticity represented by Young's modulus and a high rigidity (modulus of elasticity/density), can be easily molded, and gives a substrate having high surface smoothness through polishing.

SUMMARY OF THE INVENTION

Accordingly, one object of the present invention is to provide a glass composition which has a high modulus of elasticity represented by Young's modulus (hereinafter referred to simply as "modulus of elasticity") and a high rigidity (modulus of elasticity/density) and is capable of being effectively inhibited from bending or vibrating when used as the substrate of an information recording medium.

Another object of the present invention is to provide a substrate for information recording media, which comprises the glass composition.

Still another object of the present invention is to provide an information recording medium.

The present invention has been achieved in view of the above-described problems of prior art techniques and the above-described requirements.

The present invention provides a glass composition comprising the following components, in terms of mol %:

55 to 65% $SiO_2$,
0.5 to less than 6% $Al_2O_3$,
12 to 22% $Li_2O$,
0 to 5% $Na_2O$,
0 to 10% $TiO_2$,
0 to 3% $ZrO_2$,
0 to 8% MgO, 0 to 18% CaO, and
0 to 6% SrO, provided that the content of RO (RO=MgO+CaO+SrO) is 5 to 18%.

The glass composition preferably comprises the following components, in terms of mol %:

55 to 62% $SiO_2$,
3 to less than 6% $Al_2O_3$,
15 to 20% $Li_2O$,
1 to 4% $Na_2O$,
0 to 6% $TiO_2$,
0 to 1.5% $ZrO_2$,
0 to 8% MgO,
0 to 18% CaO, and
0 to 6% SrO, provided that the content of RO (RO=MgO+CaO+SrO) is 8 to 18%.

The glass composition preferably has a $TiO_2$ content of 0.5 to 3%.

The glass composition preferably has an SrO content of 0.5 to 4%.

The glass composition preferably does not substantially contain $ZrO_2$.

In the glass composition, the proportion of $Na_2O$ to $Li_2O$ is preferably in the range of from 1/10 to 1/5 and that of MgO to CaO is preferably in the range of from 1/4 to 1/1.

Furthermore, the glass composition preferably has a modulus of elasticity as represented by Young's modulus of 90 GPa or higher and a rigidity as represented by (Young's modulus)/(density) of 30 GPa·cm$^3$/g or higher.

The present invention further provides a substrate for information recording media, which comprises the glass composition comprising the components described above and having a modulus of elasticity as represented by Young's modulus of 90 GPa or higher and a rigidity as represented by (Young's modulus)/(density) of 30 GPa·cm$^3$/g or higher.

The present invention still further provides an information recording medium using the above substrate.

DETAILED DESCRIPTION OF THE INVENTION

The reasons for limitations of the components of the high modulus glass composition of the present invention are explained below. Hereinafter, unless otherwise indicated, all percents are by mole.

$SiO_2$ is the main component constituting the glass. If the proportion of $SiO_2$ is lower than 55%, the glass has impaired chemical durability. On the other hand, if the proportion thereof exceeds 65%, the desired modulus of elasticity is not obtained. Consequently, the proportion of $SiO_2$ should be 55 to 65%, and is preferably 55 to 62%.

$Al_2O_3$ is an ingredient which improves the modulus of elasticity, rigidity, and water resistance of the glass. If the proportion of $Al_2O_3$ is lower than 0.5%, these effects are insufficient. On the other hand, if the proportion thereof is 6% or higher, the results are an elevated liquidus temperature and impaired meltability. Consequently, the proportion of $Al_2O_3$ should be 0.5 to less than 6%, and is preferably 3 to less than 6%.

$Li_2O$ is an ingredient which improves the modulus of elasticity and rigidity of the glass and lowers the melting temperature of the glass. If the proportion of $Li_2O$ is lower than 12%, modulus of elasticity and rigidity are insufficient. On the other hand, if the proportion thereof exceeds 22%, the substrate has impaired weatherability and impaired acid resistance. Consequently, the proportion of $Li_2O$ should be 12 to 22%, and is preferably 15 to 20%.

$Na_2O$ is an ingredient which lowers the melting temperature and liquidus temperature of the glass to thereby enhance moldability. However, if the proportion of $Na_2O$ exceeds 5%, the required modulus of elasticity cannot be obtained and weatherability and acid resistance are impaired. Consequently, the proportion of $Na_2O$ should be 0 to 5%, and is preferably 1 to 4%.

Regulating the proportion of $Na_2O$ to $Li_2O$ to a value in the range of from 1/10 to 1/5 is especially advantageous in that a lowered liquidus temperature can be obtained while maintaining a high modulus of elasticity.

$TiO_2$ is an ingredient which improves the modulus of elasticity, rigidity, and weatherability of the glass. However, if the proportion thereof exceeds 10%, the glass has an elevated liquidus temperature and impaired devitrification resistance. Consequently, the proportion of $TiO_2$ should be 10% or lower, and is preferably 0 to 6%. The especially preferred range of $TiO_2$ proportion from the standpoint of moldability is 0.5 to 3%, because the $TiO_2$ contained in such an amount has the effect of lowering the liquidus temperature.

$ZrO_2$ is an ingredient which improves the modulus of elasticity, rigidity, and weatherability of the glass. However, if the proportion of $ZrO_2$ exceeds 3%, the glass has an elevated liquidus temperature and impaired moldability. Furthermore, if the proportion thereof exceeds 1.5%, there is a high possibility that fine crystals of $ZrO_2$ might precipitate in the molten glass. Consequently, the proportion of $ZrO_2$ should be 3% or lower, and is preferably 1.5% or lower, and more preferably substantially 0%.

MgO is an ingredient which heightens the modulus of elasticity, rigidity, and meltability of the glass. However, if the proportion of MgO exceeds 8%, the glass has an elevated liquidus temperature and impaired moldability. Consequently, the proportion of MgO should be 8% or lower.

CaO is an ingredient which heightens the modulus of elasticity, rigidity, and meltability of the glass. However, if the proportion of CaO exceeds 18%, the glass has an elevated liquidus temperature and impaired devitrification resistance. Consequently, the proportion of CaO should be 18% or lower.

SrO is an ingredient which reduces the meltability of the glass and heightens the modulus of elasticity of the glass. However, if the glass contains SrO in a large amount, it disadvantageously has an increased density. Consequently, the proportion of SrO should be 6% or lower, and is preferably 4% or lower. Furthermore, since SrO is highly effective in lowering the liquidus temperature of the glass, addition thereof in an amount of 0.5% or larger can improve moldability while maintaining a high modulus of elasticity.

If the total amount of MgO, CaO, and SrO (i.e., the amount of RO) is below 5%, the glass is insufficient in modulus of elasticity and rigidity. If the total amount thereof exceeds 18%, the glass has an elevated liquidus temperature and impaired moldability. Consequently, the total amount of RO should be 5 to 18%, and is preferably 8 to 18%.

Regulating the proportion of MgO to CaO to a value in the range of from 1/4 to 1/1 is especially advantageous in that a lowered liquidus temperature can be obtained while maintaining a high modulus of elasticity.

Besides the ingredients described above, other ingredients may be added or contained in a total amount of up to 3% for the purposes of coloring, melt clarification, etc. or as impurities. Examples of such optional ingredients include $As_2O_3$, $Sb_2O_3$, $SO_3$, $SnO_2$, $Fe_2O_3$, CoO, Cl, F, $K_2O$, and $Y_2O_3$.

For molding the glass composition of the present invention, molding techniques such as pressing, down-draw, and float processes are used without particular limitations. However, a float process is optimal from the standpoints of quality and cost, because it can produce a highly flat glass plate.

When this glass composition is used as a substrate for information recording media, this substrate is less apt to bend or suffer resonant vibration because it has a higher modulus of elasticity and a higher rigidity than conventional substrates. Therefore, the recording medium using this glass composition is especially suitable for use in recording apparatuses of the high rotational speed type.

The present invention will be explained below in more detail by reference to the following Examples. However, the invention should not be construed as being limited to these Examples.

EXAMPLES 1 TO 16 AND COMPARATIVE EXAMPLES 1 TO 4

Sixteen compositions as examples of the glass composition of the present invention are shown in the Table together with properties thereof. Furthermore, two glass compositions commercially available as magnetic disk substrates and two glass compositions disclosed in JP-A-10-81542 are also shown in the Table as Comparative Examples 1 and 2 and Comparative Examples 3 and 4, respectively.

Base materials for substrate glasses were prepared in the following manner.

Common raw materials for glass including silica, alumina, lithium carbonate, sodium carbonate, basic magnesium carbonate, calcium carbonate, strontium carbonate, titania, and zirconia were mixed together to prepare batches as base materials for substrate glasses such that these batches gave compositions each having the components shown in the Table. Each batch prepared was maintained at 1,550° C. for 4 hours in a platinum crucible and then poured on an iron plate. This glass was maintained at 650° C. for 30 minutes in an electric furnace. Thereafter, the furnace was switched off to cool the glass to room temperature. Thus, sample glasses were obtained.

In the Table are shown the modulus of elasticity, rigidity, and liquidus temperature of each sample glass.

Modulus of elasticity was determined by the following method.

A sample glass was cut into a piece and each side thereof was subjected to mirror polishing to obtain a platy sample having dimensions of 5×30×30 mm. Each sample was examined for density by the Archimedes method.

TABLE

| Component | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 59.6 | 62.0 | 60.2 | 60.2 | 59.1 | 60.8 | 59.1 | 59.6 | 59.5 | 60.2 | 58.5 | 58.5 |
| $Al_2O_3$ | 4.5 | 4.7 | 4.6 | 4.6 | 4.5 | 4.6 | 4.5 | 3.6 | 5.5 | 4.6 | 5.4 | 4.4 |
| $Li_2O$ | 18.6 | 19.4 | 18.8 | 18.8 | 18.5 | 21.0 | 15.6 | 18.6 | 18.6 | 17.8 | 18.3 | 18.3 |
| $Na_2O$ | 1.9 | 2.0 | 1.9 | 1.9 | 1.9 | 0.0 | 1.9 | 1.9 | 1.9 | 2.9 | 1.9 | 1.9 |
| $K_2O$ | 0.0 | 0.0 | 0.0 | 0.0 | 0.0 | 0.0 | 0.0 | 0.0 | 0.0 | 0.0 | 0.0 | 0.0 |
| MgO | 4.2 | 4.4 | 4.3 | 4.3 | 4.2 | 0.0 | 4.2 | 4.2 | 0.0 | 6.7 | 4.1 | 4.1 |
| CaO | 7.2 | 7.5 | 7.3 | 7.3 | 7.1 | 11.7 | 7.1 | 7.2 | 11.4 | 4.9 | 7.1 | 7.1 |
| SrO | 0.0 | 0.0 | 0.0 | 2.9 | 0.0 | 0.0 | 2.9 | 0.0 | 0.0 | 0.0 | 0.9 | 1.9 |
| $ZrO_2$ | 1.0 | 0.0 | 0.0 | 0.0 | 0.0 | 0.0 | 0.0 | 0.0 | 0.0 | 0.0 | 0.9 | 0.9 |
| $TiO_2$ | 2.9 | 0.0 | 2.9 | 0.0 | 4.8 | 2.0 | 4.8 | 4.8 | 3.1 | 2.9 | 2.8 | 2.8 |
| $Y_2O_3$ | 0.0 | 0.0 | 0.0 | 0.0 | 0.0 | 0.0 | 0.0 | 0.0 | 0.0 | 0.0 | 0.0 | 0.0 |
| $Na_2O/Li_2O$ | 0.103 | 0.103 | 0.103 | 0.103 | 0.103 | 0.000 | 0.122 | 0.103 | 0.103 | 0.163 | 0.103 | 0.103 |
| MgO/CaO | 0.585 | 0.585 | 0.585 | 0.585 | 0.585 | 0.000 | 0.585 | 0.585 | 0.000 | 1.378 | 0.585 | 0.585 |
| Modulus of elasticity [GPa] | 93.7 | 90.0 | 93.4 | 91.0 | 94.6 | 90.0 | 94.9 | 95.1 | 90.9 | 91.7 | 95.6 | 95.1 |
| Density [g/cm$^3$] | 2.57 | 2.49 | 2.54 | 2.58 | 2.57 | 2.54 | 2.65 | 2.57 | 2.50 | 2.57 | 2.60 | 2.60 |
| Rigidity [GPa · cm$^3$/g] | 36.4 | 36.2 | 36.7 | 35.2 | 36.8 | 35.4 | 35.8 | 37.0 | 36.4 | 35.7 | 36.7 | 36.6 |
| Liquidus temperature [° C.] | 952 | 980 | 963 | 933 | 1001 | 970 | 1007 | 1003 | 978 | 980 | 990 | 936 |

| Component | Example | | | | Comparative Example | | | |
|---|---|---|---|---|---|---|---|---|
| | 13 | 14 | 15 | 16 | 1 | 2 | 3 | 4 |
| $SiO_2$ | 59.1 | 58.5 | 59.1 | 58.8 | 71.6 | 67.8 | 45.0 | 43.0 |
| $Al_2O_3$ | 5.4 | 4.4 | 4.5 | 3.5 | 0.9 | 10.5 | 25.0 | 25.0 |
| $Li_2O$ | 15.6 | 18.3 | 15.6 | 18.4 | 0.0 | 0.0 | 0.0 | 0.0 |
| $Na_2O$ | 1.9 | 1.9 | 1.9 | 1.9 | 12.7 | 13.1 | 0.0 | 0.0 |
| $K_2O$ | 0.0 | 0.0 | 0.0 | 0.0 | 0.5 | 2.3 | 0.0 | 0.0 |
| MgO | 4.2 | 4.1 | 4.2 | 4.2 | 6.0 | 5.2 | 25.0 | 15.0 |
| CaO | 7.1 | 7.1 | 7.1 | 7.1 | 8.4 | 0.5 | 0.0 | 10.0 |
| SrO | 0.0 | 0.0 | 2.9 | 0.0 | 0.0 | 0.0 | 0.0 | 0.0 |
| $ZrO_2$ | 0.0 | 2.8 | 1.0 | 1.4 | 0.0 | 0.0 | 0.0 | 2.0 |
| $TiO_2$ | 6.7 | 2.8 | 2.9 | 4.7 | 0.0 | 0.6 | 5.0 | 5.0 |
| $Y_2O_3$ | 0.0 | 0.0 | 1.0 | 0.0 | 0.0 | 0.0 | 0.0 | 0.0 |
| $Na_2O/Li_2O$ | 0.122 | 0.103 | 0.122 | 0.103 | | | | |
| MgO/CaO | 0.585 | 0.585 | 0.585 | 0.585 | 0.72 | 10.4 | | 1.50 |
| Modulus of elasticity [GPa] | 95.6 | 97.2 | 96.4 | 97.5 | 72.0 | 72.0 | 113.4 | 112.0 |
| Density [g/cm$^3$] | 2.60 | 2.63 | 2.70 | 2.61 | 2.50 | 2.46 | 2.81 | 2.84 |
| Rigidity [GPa · cm$^3$/g] | 36.8 | 37.0 | 35.7 | 37.4 | 28.8 | 29.3 | 40.4 | 39.4 |
| Liquidus temperature [° C.] | 1066 | 1105 | 962 | 1001 | 1020 | | >1180 | >1180 |

Modulus of elasticity: Young's modulus
Rigidity: (Young's modulus)/(density)

Furthermore, the modulus of elasticity of each sample was calculated by the ultrasonic method using a sing-around oscillator.

Liquidus temperature was measured in the following manner.

A sample glass was crushed. The resulting glass particles which had passed through a 2,380 μm screen but not passed through a 1,000 μm screen were immersed in ethanol, subjected to ultrasonic cleaning, and then dried in a thermostatic chamber. In a platinum boat having a width of 12 mm, a length of 200 mm, and a depth of 10 mm were placed 25 g of the glass particles in an almost even thickness. This boat containing the glass particles was maintained for 2 hours in a furnace having a temperature gradient ranging from 930 to 1,180° C. Thereafter, the boat was taken out of the furnace and the glass was examined for devitrification with an optical microscope at a magnification of 40. The highest temperature at which devitrification was observed was taken as the liquidus temperature.

As shown in the Table, the glasses of Examples 1 to 16 according to the present invention each had a modulus of elasticity exceeding 90 GPa and a rigidity of 35 GPa·cm$^3$/g or higher.

In contrast, the glasses of Comparative Examples 1 and 2 each had a modulus of elasticity lower than 90 GPa and a rigidity lower than 30 GPa·cm$^3$/g.

The glasses obtained in the Examples according to the present invention mostly had a liquidus temperature of 1,020° C. or lower and the highest one thereof was about 1,100° C. in contrast to the liquidus temperatures of the glasses of Comparative Examples 3 and 4, which were higher than 1,180° C. Consequently, the glasses of the Examples proved to be easily molded.

Furthermore, the densities of the glass compositions according to the present invention were 2.7 g/cm$^3$ or lower, and were mostly 2.6 g/cm$^3$ or lower, showing that these glass compositions are effective in reducing the load to be imposed on a disk drive. In contrast, the glasses of Comparative Examples 3 and 4 had a density of 2.8 g/cm$^3$ or higher, showing that a disk drive should be operated under an increased load and the apparatus necessitates an increased power consumption.

The sample glass of Example 1 described above was cut into a ring form having an outer diameter of 95 mm and an inner diameter of 20 mm. This disk was ground, polished, and then subjected to mirror polishing (surface roughness $R_a \leq 2$ nm; JIS B 0601-1994) to regulate the thickness thereof to 1.2 mm.

This disk was immersed for 1 hour in a mixed molten salt of KNO3 and NaNO$_3$ (80:20) heated at 380° C. to conduct tempering. Thus, a substrate for magnetic recording media was obtained.

Using the thus-produced substrate for magnetic recording media, a magnetic disk medium was produced in the following manner.

Chromium, Co—Cr—Ta, and carbon were deposited on the substrate as an undercoat layer, recording layer, and protective layer, respectively, by sputtering. A lubricating layer was further formed thereon to obtain a magnetic disk medium.

The medium thus obtained was set in a closed type magnetic-disk drive and continuously rotated at each of 10,000 rpm and 12,000 rpm. In either case, the medium was found to be free from troubles such as head crushing caused by substrate vibration, because the glass substrate had a high modulus of elasticity and a high rigidity.

As described above in detail, the following effects are brought about by the present invention.

According to the present invention, a glass composition having a higher modulus of elasticity (Young's modulus) and a higher rigidity (Young's modulus/density) than conventional glasses can be obtained.

According to one prepared embodiment of the present invention, a high rigidity and high modulus glass composition which can be easily produced can be obtained because the range of the proportion of each glass component has been narrowed.

According to another preferred embodiment of the present invention, a high rigidity and high modulus glass composition can be obtained which has a lowered liquidus temperature and is hence more easily moldable.

According to still another preferred embodiment of the present invention, a high rigidity and high modulus glass composition which is even more easily moldable can be obtained.

According to a further preferred embodiment of the present invention, a high rigidity and high modulus glass composition of high quality can be obtained which has been improved in modulus of elasticity, rigidity, and weatherability and is free from the problem that zirconium separates out as fine crystals from the melt to form defects.

According to still a further preferred embodiment of the present invention, a high rigidity and high modulus glass composition can be obtained which has better meltability and moldabilty, i.e., which can be produced easily.

According to still a further preferred embodiment of the present invention, a glass composition is obtained which can have specific high values of rigidity and modulus of elasticity, which are higher than those of the conventional glasses and conventional aluminum alloy.

According to the present invention, a glass substrate comprising the above glass composition and suitable for use as the substrate of an information recording medium can be obtained which has a high rigidity and a high modulus of elasticity, is less weighted down by itself, and is less apt to suffer resonant vibration.

According to the present invention, a recording medium employing the above glass substrate having a high rigidity and a high modulus of elasticity can be obtained. This recording medium can be rotated at a higher speed, bends less, and is less apt to suffer resonant substrate vibration. Hence, the gap between the magnetic disk, head and the recording medium can be narrowed, making it possible to attain an increase in storage capacity and a reduction in access time. Therefore, the recordiing medium employing the glass composition is especially suitable for use in recording apparatuses of the high rotational speed type.

While the invention has been described in detail and with reference to specific embodiments thereof, it will be apparent to one skilled in the art that various changes and modifications can be made therein without departing from the spirit and scope thereof.

What is claimed is:

1. A glass composition consisting of the following components, in terms of mol %:

55 to 65% $SiO_2$,
0.5 to less than 6% $Al_2O_3$,
12 to 22% $Li_2O$,
0 to 5% $Na_2O$,
0 to 10% $TiO_2$,
0 to 3% $ZrO_2$,
O to 8% MgO,
0 to 18% CaO, and
0 to 6% SrO, provided that the content of RO (RO=MgO+CaO+SrO) is 5 to 18% and at least one of $As_2O_3$, $Sb_2O_3$, $SO_3$, $SnO_2$, $Fe_2O_3$, CoO, Cl, F, $K_2O$, and $Y_2O_3$ is amount of up to 3 mol %, and wherein the proportion of $Na_2O$ to $Li_2O$ is in the range of from ¹/₁ to ¹/₅ and that of MgO to CaO is in the range of from ¼ to ¹/₁.

2. The glass composition as claimed in claim 1, which consists of the following components, in terms of mol %:

55 to 62% $SiO_2$,
3 to less than 6% $Al_2O_3$,
15 to 20% $Li_2O$,
1 to 4% $Na_2O$,
0 to 6% $TiO_2$,
0 to 1.5% $ZrO_2$,
0 to 8% $MgO$,
0 to 18% $CaO$, and
0 to 6% $SrO$, provided that the content of RO (RO=MgO+CaO+SrO) is 8 to 18% and at least one of $As_2O_3$, $Sb_2O_3$, $SO_3$, $SnO_2$, $Fe_2O_3$, CoO, Cl, F, $K_2O$, and $Y_2O_3$ is contained or added in a total amount of up to 3 mol %, and wherein the proportion of $Na_2O$ to $Li_2O$ is in the range of from $1/10$ to $1/5$ and that of MgO to CaO is in the range of from $1/4$ to $1/1$.

3. The glass composition as claimed in claim 1, wherein the content of $TiO_2$ is 0.5 to 3%.

4. The glass composition as claimed in claim 1, wherein the content of SrO is 0.5 to 4%.

5. The glass composition as claimed in claim 1, which does not contain $ZrO_2$.

6. The glass composition as claimed in claim 1, which has a modulus of elasticity as represented by Young's modulus of 90 GPa or higher and a rigidity as represented by (Young's modulus)/(density) of 30 GPa·cm³/g or higher.

7. A substrate for information recording media, which comprises the glass composition as claimed in claim 1, having a modulus of elasticity as represented by Young's modulus of 90 GPa or higher and a rigidity as represented by (Young's modulus)/(density) of 30 GPa·cm³/g or higher.

8. An information recording medium using the substrate as claimed in claim 7.

* * * * *